March 9, 1943. F. LJUNGSTRÖM 2,313,081
HEAT EXCHANGE
Filed Feb. 1, 1938  3 Sheets-Sheet 1

INVENTOR
Fredrik Ljungström
BY
his ATTORNEY

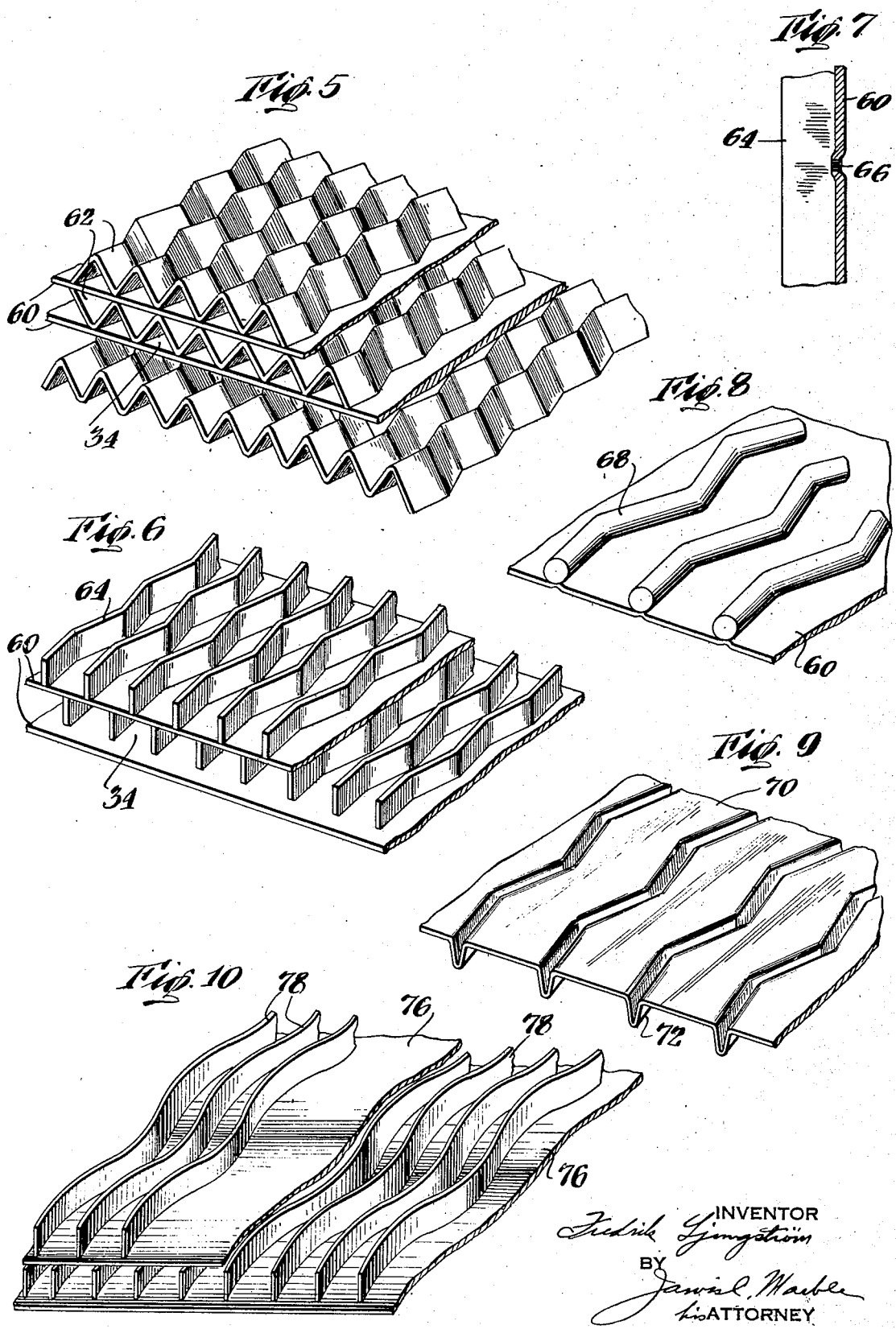

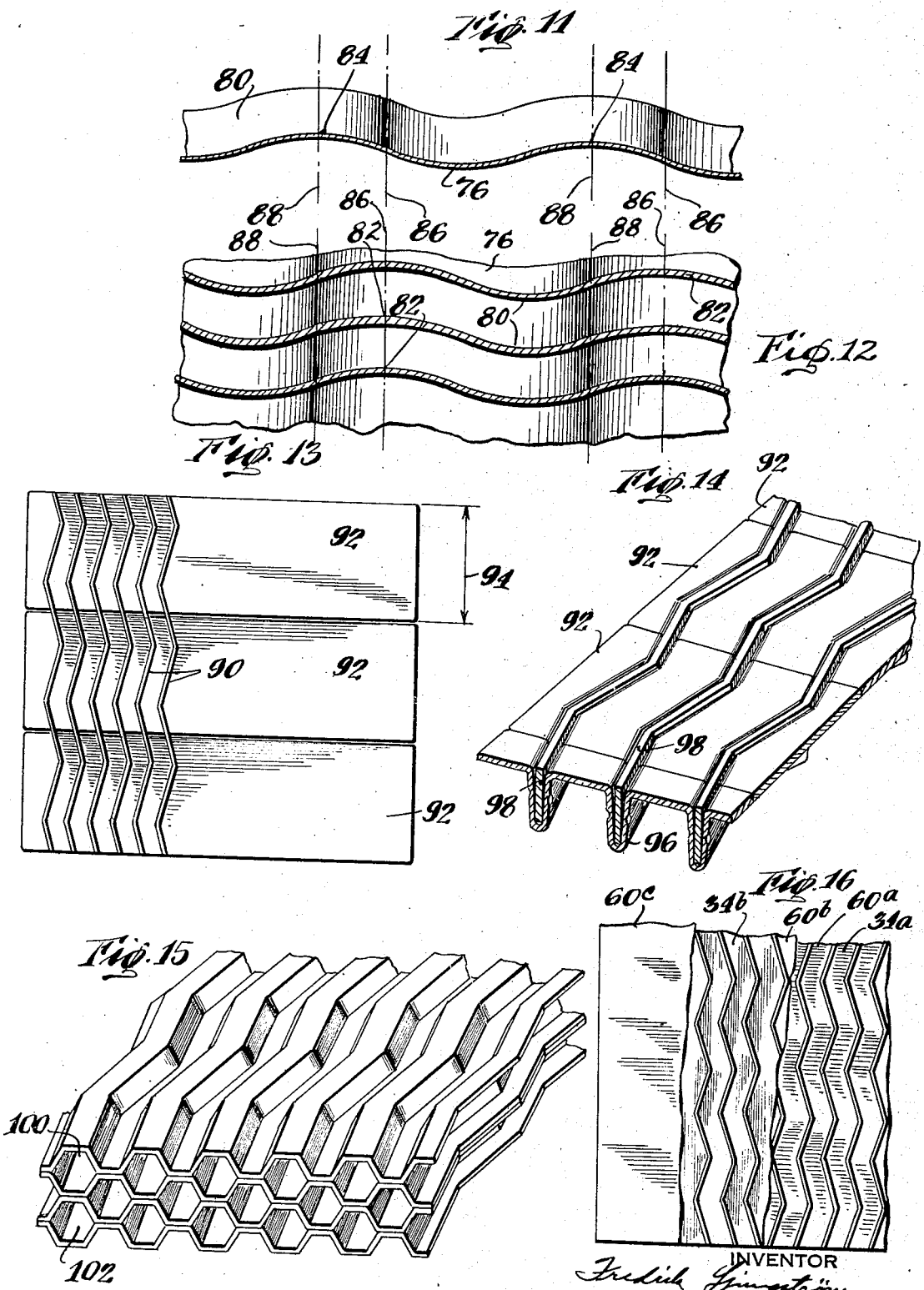

Patented Mar. 9, 1943

2,313,081

UNITED STATES PATENT OFFICE 2,313,081

HEAT EXCHANGE

Fredrik Ljungström, Brevik, Lidingo, Sweden, assignor, by mesne assignments, to Jarvis C. Marble, Leslie M. Merrill, and Percy H. Batten, trustees Application February 1, 1938, Serial No. 188,027
In Sweden February 2, 1937

1 Claim. (Cl. 257—6)

The present invention relates to heat exchange and has particular reference to heat exchange apparatus for preheating air or other gaseous fluids. Still more particularly, the invention relates to air preheaters of the regenerative type.

In heat exchange apparatus of the kind referred to, in which heat exchange is effected between different gaseous fluids by passing them out of contact with each other through a multiplicity of passages to the walls of which they give up heat or from the walls of which they absorb heat, the most desirable condition to attain is that which will effect the maximum rate of heat transfer from fluid to wall surface per unit area of the latter and at the same time provide the minimum resistance to flow of the gaseous fluid through the passages to the walls of which it either gives up heat or from the walls of which it receives heat.

This is particularly desirable in the so-called regenerative type of preheater provided with what is commonly termed regenerative mass consisting of a multiplicity of passages formed between metal plates or the like, through which a heating gas such as flue gas is passed to heat the walls of the passages and through which heated mass the fluid to be heated such as air is then passed in order to be heated by heat given up by the hot walls of the passages.

Because of its particularly advantageous application to heat exchange apparatus of the regenerative type, the invention will be described in connection with such apparatus but it will be understood that it is not limited in its application to the specific kind of heat exchanger hereinafter described by way of example.

In order to attain the objects of high rate of heat transfer and low resistance to fluid flow, the construction of regenerative mass has heretofore fallen into two general categories. In one category straight, smooth wall passages have been provided, which passages give the minimum resistance to flow of fluid but which also are relatively inefficient with respect to rate of heat transfer because of the tendency of the gases to "lane" in the passages so that all of the gas passing through any one passage is not brought uniformly into contact with the walls of the passage to either give heat thereto or receive heat therefrom.

The second general category of prior construction proposes to increase the rate of heat transfer as compared with smooth, straight passages by the provision of ridges, waves, corrugations or the like which serve to create the turbulence necessary to break up laning of the gases with consequent better heat exchange contact between all of the gas in any one passage and the walls thereof than would otherwise be the case. The means of this category, previously suggested, are effective to increase the rate of heat transfer but are accompanied by the disadvantage of substantially increased resistance to flow of gas through the passage.

A principal object of the present invention is to improve upon prior forms of construction, particularly in the field of regenerative heat exchange mass, so as to secure an increased rate of heat transfer as compared with that possible with smooth, straight passages, while at the same time not increasing the resistance to flow, as compared with such passages, in the manner in which such resistance is increased by previously proposed constructions. The above general object and other and more detailed objects and advantages of the invention will more fully appear in the following portion of this specification in which several embodiments of apparatus for carrying the invention into effect will be described in conjunction with the accompanying drawings forming a part hereof.

In the drawings:

Fig. 5 is a perspective view of regenerative mass embodying the invention;

Fig. 6 is a similar view showing another form of such mass;

Fig. 7 is a view on enlarged scale showing a detail of the structure of Fig. 6.

Figs. 8 to 10, inclusive, are views showing further forms of regenerative mass embodying the invention;

Figs. 11 and 12 are more or less diagrammatic views taken at right angles to each other and illustrative of still another form of regenerative mass;

Fig. 13 is a view showing a still further form of regenerative mass;

Fig. 14 is a section illustrating a modification of the structure shown in Fig. 13; and Figs. 15 and 16 are views illustrative of still further forms of regenerative mass.

Figure 1:
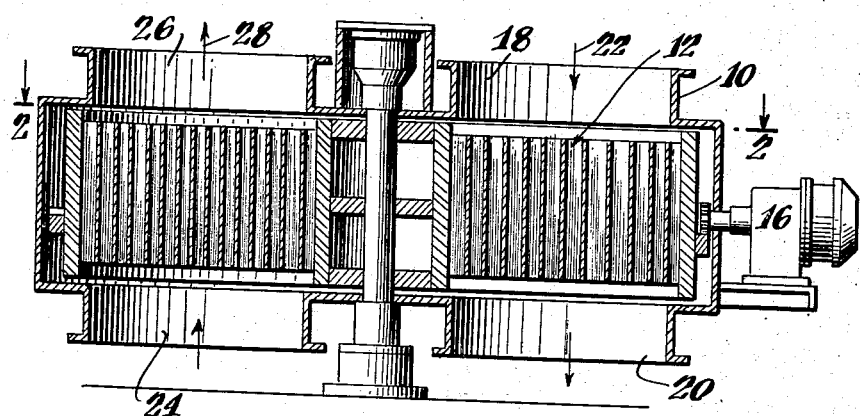
Fig. 1 is a more or less diagrammatic vertical cross-section of a regenerative air preheater suitable for carrying the invention into effect.
Figure 2:
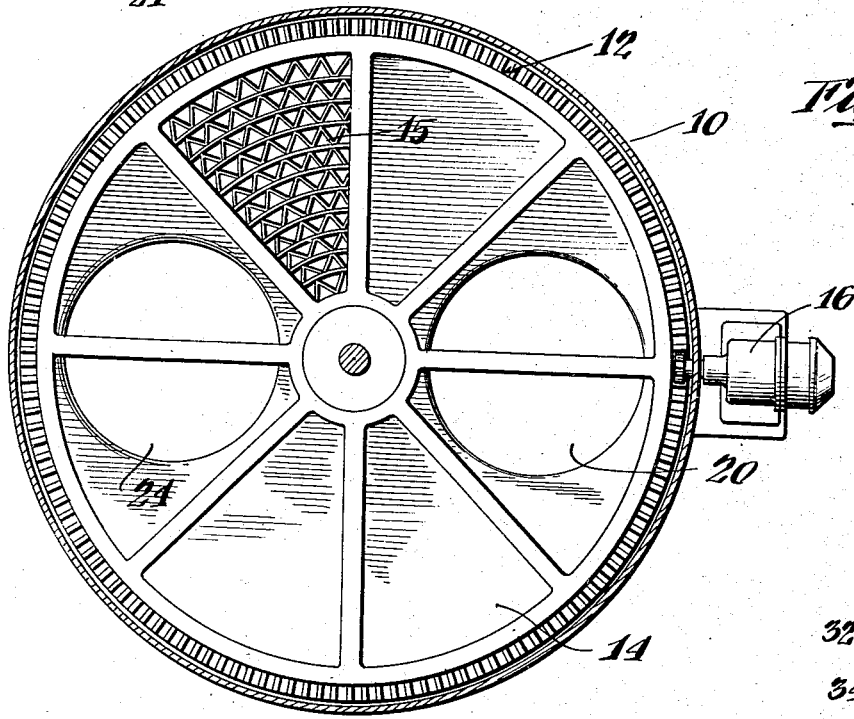
Fig. 2 is a section on enlarged scale taken on the line 2—2 of Fig. 1.

Referring now to Fig. 1, there is shown therein a regenerative air preheater of the well known Ljungstrom type within which the various embodiments of the invention hereinafter to be described may advantageously be employed. In this structure there is provided a stationary casing 10 within which there is rotatably mounted about a vertical axis a rotor indicated generally at 12. This rotor, as shown in Fig. 2, comprises a frame work providing a series of compartments 14 in which the regenerative mass, with which the present invention is primarily concerned and which is indicated generally at 15, is located. Rotor 12 is slowly rotated as by means of a geared motor 16 so that the passages formed in the regenerative mass are first brought into registry with inlet and outlet openings 18 and 20 respectively in the casing structure for flow of one of the gases, for example the heating gas such as flue gas which advantageously flows through the apparatus in the direction of the arrows 22. Rotation of the rotor further brings the regenerative mass which has passed in registry with openings 18 and 20 into registry with inlet and outlet openings 24 and 26, respectively, in the casing structure for flow through the mass of the gas to be heated thereby, such as air, which advantageously flows in the direction of the arrow 28. Suitable packing and sealing means are employed in such a structure to prevent intermingling of the two gaseous fluids but the construction of this type of preheater is so generally known in the art that further details thereof are not required to be described herein for an understanding of the present invention.

As previously noted, the regenerative mass consists of metal plate structures formed to provide a multiplicity of passages for flow of the gases through the rotor and it is characteristic of regenerative mass constructed in accordance with the present invention that these passages be of substantially uniform cross-sectional area from end to end and that they be formed to provide a tortuous flow of gas through the passages, which tortuous flow may be said to follow a generally zig-zag or sinuously curved path. This sinuously curved path or flow may be sinuous, as will hereinafter be more fully explained, either with respect to only one plane or with respect to intersecting planes, in which event the flow may follow what may be termed a helical path.

Figure 4:
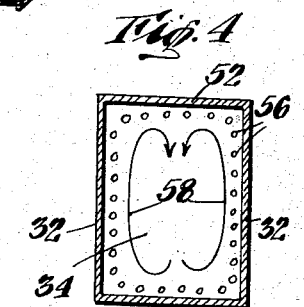
Fig. 4 is a section taken on the line 4—4 of Fig. 3.

In order to more readily understand the manner in which the advantages of the invention are attained through the utilization of structures embodying the invention, which will hereinafter be described more in detail, the theory of the action which takes place in accordance with the invention will now be discussed in conjunction with Fig. 3 in which it will be assumed for the moment that the gas is caused to flow through a sinuously curved passage which is sinuous only in the plane of the paper. In this figure the sinuous side walls of the passage are provided by the bent plates 30 and the remaining walls by the plane plates 32 (Fig. 4). The passage formed by these plates is indicated generally by the numeral 34.

Through passage 34, gas flows with a velocity indicated by vectors 36. This gas is deflected within the passage in a circular path of flow by the bent walls of the passage, this circular path of flow being limited at the inner side by an arcuate path having a radius of curvature 38. The outer limit of the arcuate path has a radius of curvature 40.

In accordance with kinetic laws, the velocity represented by vectors 36 is altered by this circular flow so that gas molecules flowing at different radii between radii 38 and 40 will have velocities relative to each other which are inversely proportional to the radii of curvatures 38 and 40 and which are indicated by the vectors 42, 44, 46, 48, and 50.

According to the law of conservation of energy, the static pressure within the arcuately flowing body of gas will then fall toward the inner turn and will rise toward the outer turn, in a manner such that the sum of the kinetic and static pressures on different radii will be the same. If, for example, the velocity of flow be 4.9 meters per second at the outer turn, and twice this velocity or 9.8 meters per second at the inner turn, both of which velocities of flow correspond to doubling the radius of the inner turn to provide the outer turn, a static difference in pressure will be created between that existing at the wall 52 of the inner turn and the wall 54 of the outer turn, which pressure differences will be equal to the kinetic pressure level between the two velocities, or equal to 3.67 meters gas column. This pressure difference thus exists in the static pressure of the molecules between the gas molecules at the outer turn and at the inner turn. The above example is based without taking friction into account, but for practical purposes friction may be disregarded since a gas current flowing in an arcuate passage of the kind shown may lose only a very small portion of its energy of flow through friction.

Figure 3:
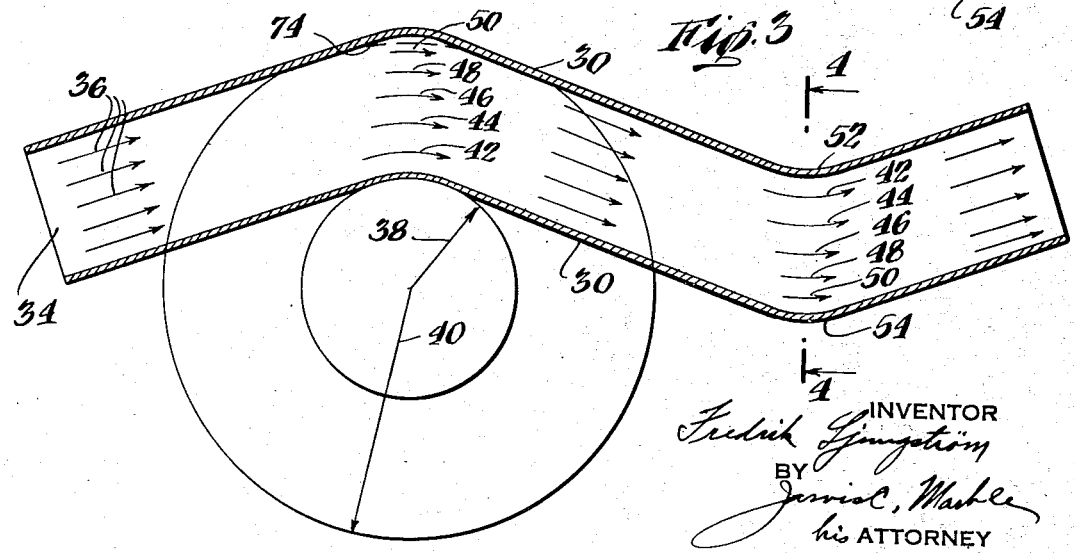
Fig. 3 is a diagrammatic representation of a gas passage embodying the principles of the invention.

If a section of the passage taken on line 4—4 of Fig. 3 is considered, a layer of molecules indicated at 56 in Fig. 4 is to be found along the walls, the velocity of flow of which may be considered as being zero since their velocity of movement relative to the walls is exceedingly slight. The molecules inside this layer, which are moving at the velocities represented by the vectors 42 to 50 are subjected to centrifugal force which force, however, is not exerted on the circumscribing layer of molecules which are assumed to be at zero velocity. Under the influence of centrifugal force, the rapidly flowing molecules exert a pressure effect on one another which is cumulative from the inner turn toward the outer turn. The value of this pressure may be calculated as indicated above. The molecules 56 of the circumscribing layer do not exert any such centrifugal pressure effect on one another, but form when left to themselves, a chain of constant pressure between the points 52 and 54. Between these two points, however, a pressure difference exists which as before indicated may be, for example, equivalent to several meters of gas column. The whole of this pressure difference therefore tends to accelerate the molecules 43 in the stationary chain of molecules in the circumscribing layer between the points 54 and 52. Because of this, forces are set up by this flow process which will positively and with considerable energy oppose the creation of such comparatively stationary circumscribing layer, and which further will create powerful circulating currents transversely of the generally longitudinal direction of the passage, in a manner such as is indicated by the arrows 58.

It is to be noted in this connection that the greatest pressure effect on the molecules is applied to those molecules which are slowest moving, and that the frictional loss within the arcuate passage is constituted substantially solely by the creation of this powerful cross current within the circumscribing or limit layer. On the other hand, in the central portion of the passage, the kinetic and static pressures balance each other, so that a comparatively smooth and harmonious low-loss flow occurs in these portions.

The desired character of passage for producing flow of the kind just described may be obtained with many different specific forms of construction, some of which will now be described by way of example.

In the construction shown in Fig. 5, the passages 34 of generally triangular cross-section are provided by smooth flat plates 60 spaced apart in parallel relation, the spaces between these plates being occupied by corrugated plates 62 which as will be observed from the figure are crimped to bend the corrugations into sinuous form lengthwise and thus provide passages 34 which are of sinuously zig-zag configuration with respect to the plane of the plates 60.

In the form of construction illustrated in Fig. 6, the spaced flat plates 60 are separated by a series of parallel sinuously curved plate strips 64 which, as will be readily observed from the figure, result in the production of passages 34 of square cross-section, the construction conforming to that indicated in Figs. 3 and 4. The strip 64 may advantageously be secured to the plates 60 by spot welding as indicated at 66 in Fig. 7, and in building up the pack of regenerative mass it will be evident that sub-units can be made by welding a series of strips to one side of each of the flat plates or strips may be welded to both sides of one plate and the pack assembled by inserting between these sub-units flat plates to which strips are not welded.

Means other than plate strips may be used for spacing the plane plates and providing the sinuous passages. As shown in Fig. 8, the plates 60 may be spaced by sinuously bent wires 68 spot welded to the plates.

In the modification shown in Fig. 9, plates 70 may be provided which are deeply crimped to provide sinuous projections or crests 72 for the formation of the sinuous passages. Obviously, plates 70 may be crimped to provide projections 72 extending outwardly only from one side of the plate as shown in the figure, or from both sides. In the latter case, the crimped plates 70 are separated by smooth plates.

The projections or crests extending between the flat plates and which are curved to give the sinuous character to the passages may be thickened at their places of curvature as indicated by the dash line 74 in Fig. 3. If the projections are of the type shown at 72 in Fig. 9, this increase in thickness may readily be made by wider spacing of the walls of the projection at places of curvature.

A further embodiment is illustrated in Fig. 10 in which the passages, of square cross-section, are formed by undulated plates 76 bent to sinuously curved form and separated by plate strips 78 which are straight in one direction but cut, in the plane of the strips, to undulating form, to fit the undulations in the plates 76. Strips 78, as in the embodiment shown in Fig. 6, may advantageously be secured by spot welding.

Figs. 11 and 12 illustrate a further embodiment of the invention. In this embodiment the undulated plates 76 are separated by undulated strips 80 which have an edge contour similar to the strips 78 of Fig. 10 but which when viewed edgewise, as in Fig. 12, are undulated as shown in this figure. The undulation shown in Fig. 12 is formed with its wave crests 82 longitudinally displaced by a quarter of a wave length from the wave crests 84 of the edge contours. This out-of-phase relationship is indicated by the two dotted lines 86 and 88 which represent the relative positions of the wave crests when viewed from one or the other of the planes of Figs. 11 and 12. By means of this kind of assembly, continuously extending tortuous passages are provided which provide a curvilinear path of flow of generally helical extent.

Still another embodiment of structure is illustrated in Fig. 13, which modification permits of very considerable saving in the amount of regenerative mass. In this form, zig-zag or undulated plates 90 are fixed by means of spot welding to flat plate structures consisting of a series of relatively narrow plates 92 which are held together by the continuous strip plates 90. By means of this arrangement the plates 92 may be made relatively narrow as indicated at 94.

This construction is highly advantageous if the structure is to be made of stainless steel or other high temperature resisting material. Such material is extremely expensive as compared with ordinary materials and it is accordingly highly important from a practical standpoint that such material be made as thin as possible in order to conserve weight of material used and avoid excessive cost. Steels such as stainless steel are extremely difficult to hot work and as a result it is difficult to obtain hot rolled steel of this character in thickness below 0.5 mm. If thinner material than this is desired, cold rolled steel must be employed. Because of factors inherent in cold rolling processes, very thin cold rolled material is limited to relatively narrow width of sheet.

Obviously the construction shown in Fig. 13 enables the very thinnest of material to be used. Instead of using separate strips 90 to hold the plates 92 together, these latter plates may be crimped to provide undulating projections 96 as shown in Fig. 14, which projections are similar to the ones shown at 72 in Fig. 9. With such projections the several plates 92 may advantageously be held together in assembled relation by means of narrow strips 98 spot welded between the walls of the projections and having a length sufficient to extend across the width of several of the plates 92.

In the embodiment shown in Fig. 15 the plates are crimped to provide sinuous shallow and relatively open projections 100 which when placed, as shown in the figure, back to back with similarly crimped plates serve to provide sinuous passages 102 of hexagonal cross section. Obviously other specific shaping of the plates may be employed to produce passages the cross sectional form of which is as described.

As shown in Figs. 5 and 6 the passages between different sets of flat plates are uni-directional, this however, is not essential and such constructions may be modified by making the arrangement such as is shown in Fig. 16 where the sinuous passages 34a between two adjacent plates 60a and 60b are not uni-directional with the passages 34b formed between plates 60b and 60c.

It will be evident from the foregoing that characteristic of all of the embodiments are the features of uniformity of cross section of the passages, a curvilinear path of flow for the column of fluid passing therethrough and absence of projections of the kind upon which impurities in the gases flowing through the passages are likely to be deposited. Also, it is to be noted that a minimum of cross sectional area may be taken up by the solid matter of the regenerative mass. Consequently the net area for flow of gas through a given heat exchange structure, represented by the difference in cross sectional area between that of the compartments 14 (Fig. 2) and the total cross sectional area of the metal in the regenerative mass, may be a maximum.

It is further to be noted that while the path of flow given to the gases is curved there is no abrupt change in direction of the kind which creates turbulent flow and the resistance resulting from such turbulent flow. Consequently, without producing such resistance and without involving the risk of clogging, due to the deposits on projecting ridges or corrugations, high rate of heat transfer is obtained through the nature of the flow inherent in the gas itself, which may be said to be a gas-kinetic process directly counteracting the tendency to produce a stationary or substantially stationary circumscribing or limit layer of gas adjacent to the walls of the passage, the existence of which would interfere materially with the rate of heat transfer.

Further, the general principles of the invention permit very ready adaptation of the structure to the heat exchange requirements of any particular case. Thus if unusually high rate of heat transfer is desired the difference in the radius of curvature between the inner turn and the outer turn of the gas passage may be increased. For reasons that will be clear from preceding discussion herein this will obviously create a more powerful cross circulation because of a greater centrifugal pressure difference.

On the other hand if circumstances permit of a lower rate of heat transfer a smaller difference between the outer and the inner radius of curvature of a passage may be employed.

Where very high rates of heat transfer are desired, because circumstances require the use of very expensive materials such as stainless steel, these high rates may be obtained as noted above and the quantity of material correspondingly reduced. When high rates of heat transfer are obtained by more powerful centrifugal pressure difference, greater fan capacity must be employed but the increase in work necessary to secure this greater pressure difference is more than compensated for by the results obtained. By means of the present invention high rates of heat transfer may be obtained without the corresponding increase in work necessary to force the gases through the apparatus that is necessary to secure an increased rate of heat transfer by the production of turbulent flow as heretofore proposed.

Obviously, other forms of apparatus than those hereinbefore described may be employed within the scope of the invention, which is defined in the appended claim.

What is claimed:

Heat exchange apparatus including plate structure providing the walls of a multiplicity of passages for flow of fluid media therethrough, said plate structure being shaped and arranged to provide parallel passages immediately adjacent to each other and separated only by a common wall plate therebetween, said passages being of uniform cross-sectional area from end to end thereof and being curved to provide a path of flow which is generally sinuously curved with respect to each of two intersecting planes approximately at right angles to each other and in which the curvature in one plane is out of phase with the curvature in the other plane.

FREDRIK LJUNGSTRÖM.